United States Patent [19]

Nakanishi et al.

[11] Patent Number: 4,673,164
[45] Date of Patent: Jun. 16, 1987

[54] SEALING MECHANISM FOR A BALL VALVE

[75] Inventors: Sadayuki Nakanishi, Hyogo; Kenichi Hayama, Kobe, both of Japan

[73] Assignee: Kabushiki Kaisha Kobe Seiko Sho, Kobe, Japan

[21] Appl. No.: 833,512

[22] Filed: Feb. 21, 1986

Related U.S. Application Data

[63] Continuation of Ser. No. 598,535, Apr. 10, 1984, abandoned.

[30] Foreign Application Priority Data

Apr. 12, 1983 [JP] Japan .................................. 58-64218

[51] Int. Cl.$^4$ .............................................. F16K 5/20
[52] U.S. Cl. ...................................... 251/174; 251/317
[58] Field of Search ........................ 251/174, 315, 317

[56] References Cited

U.S. PATENT DOCUMENTS

| | | | |
|---|---|---|---|
| 2,825,527 | 3/1958 | Wendell | 251/315 X |
| 3,109,623 | 11/1963 | Bryant | 251/315 X |
| 3,335,999 | 8/1967 | Lowrey | 251/317 X |
| 3,508,738 | 4/1970 | Atkinson | 251/315 |
| 3,780,986 | 12/1973 | Fujiwara | 251/315 |

Primary Examiner—Martin P. Schwadron
Assistant Examiner—Stephen M. Hepperle
Attorney, Agent, or Firm—Oblon, Fisher, Spivak, McClelland & Maier

[57] ABSTRACT

A seal mechanism in a ball valve in which a valve seat made of an elastic material such as rubber is enforced under pressure into a seat retaining groove defined with a half-groove formed along the outer circumference on the top end of an inner ring and a half-groove formed along the inner circumference on the top end of an outer ring, and the diameter for the sealing point at the corner on the top end along the inner circumferential surface of the valve seat bulging out of the seat retaining groove to be in press contact with a ball-like valve body is made greater than the diameter for the sealing point at the corner on the counter-top end along the inner circumferential surface of the valve seat facing the side wall on the counter-top end of the inner ring that constitutes said half-groove, is improved for the sealing performance under the high fluid pressure condition such that an inner groove is formed at a part on the counter-top end along the circumferential wall of the inner ring that constitutes the half-groove and the counter-top end along the inner circumferential surface of the valve seat is adapted to bulge into the inner groove when a fluid pressure is exerted to the inner ring in the direction of compressing the valve seat.

5 Claims, 7 Drawing Figures

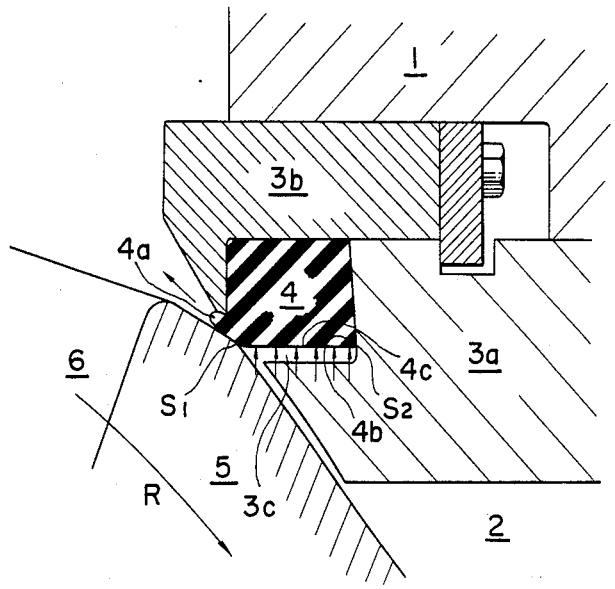
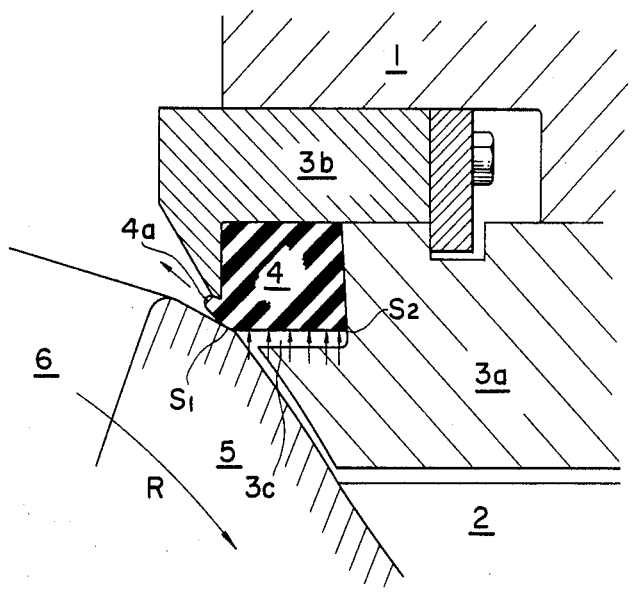

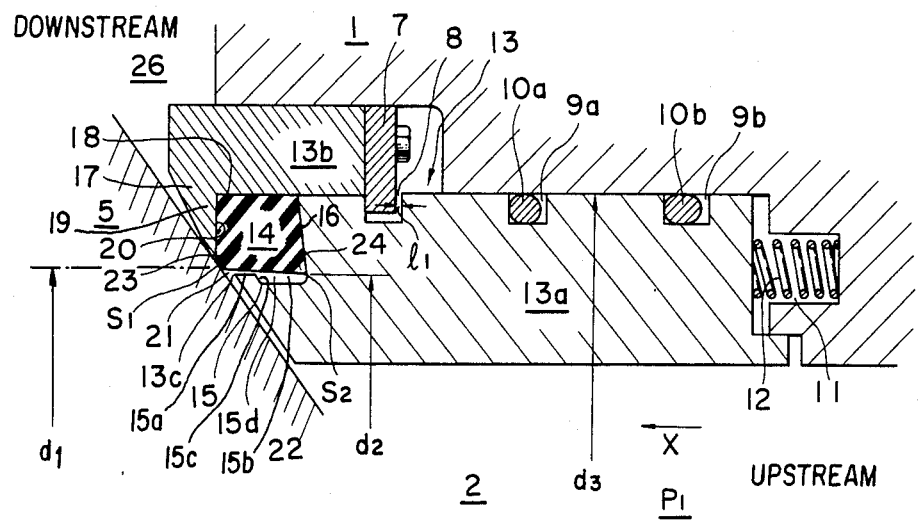
FIG. 4(A)
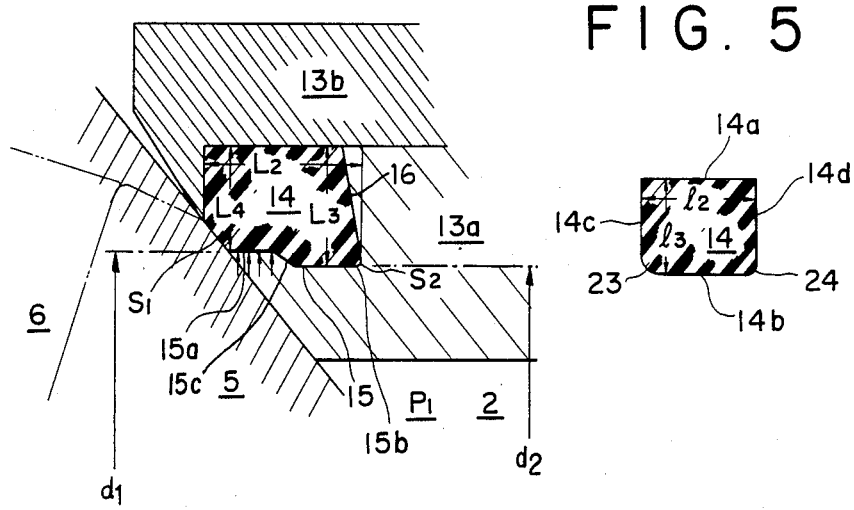
FIG. 4(B)
FIG. 5

SEALING MECHANISM FOR A BALL VALVE

This application is a continuation of application Ser. No. 598,535, filed Apr. 10, 1984, now abandoned.

BACKGROUND OF THE INVENTION

1. Field of the Invention

This invention concerns a seal mechanism for a ball valve.

2. Description of the Prior Art

Seal members for use in ball valves have been known to include elastic seats made of rubber or the like having a relatively soft nature and a plastic seat or metal seat having a relatively high degree hardness. Since the latter rigid seats are lacking in sealing performance under cold temperature conditions such as at several tens of degrees Centigrade below the freezing point, it is desirable to use the former elastic seat under such a condition.

However, since the elastic seat is soft in nature, a problem that occurs is that the portion of the seat that initially faces the through-hole of a ball-like valve body upon the initial stage of valve opening operation will bulge out of a seat retaining groove.

A counter-measure for resolving such a problem is proposed in Japanese Patent Laid-Open No. 63061/1980, which is illustrated in FIG. 1 of this application.

In a ball valve illustrated in FIG. 1, a half-groove is formed along the outer periphery at the top end of an inner ring 3a and a half-groove is formed along the outer periphery at the top end of an outer ring 3b, and the half-grooves constitute a seat retaining groove 3c. A valve seat is 4 made of rubber is tightly forced into the groove 3c and adapted such that the radial dimension d1 for a sealing point S1 at the corner 4a on the top end along the inner circumferential surface of the valve seat in pressure contact with a ball-like valve body 5 while a valve seat 4 also bulges out of the seat retaining groove 3c. Radial dimension d1 is made larger than the radial dimension d2 for a sealing point S2 at the corner 4b on the end opposite to the top end (hereinafter referred to as a counter top end) along the inner circumferential surface of the valve seat that faces the side wall 3d on the counter-top end of the inner ring 3a that forms the above mentioned half-groove.

According to the foregoing structure, as illustrated in FIG. 2, since the inner circumferential surface 4c of the seat 4 is inclined, the fluid pressure P1 acting vertically on the inner circumferential surface 4c is exerted as a component P1(Y) directed radially outwardly and as a component P1(X) directed away from the valve body with respect to the fluid passing direction, whereby the seat 4 is continuously forced into the groove 3c and, accordingly, the seat can effectively be prevented from bulging out of the groove 3c.

However, the seal mechanism constituted as described above having the seat 4 made of rubber with hardness of about 80 presents a problem in that the effective prevention for the bulge of the seat 4 can no more be ensured if the fluid pressure P1 increases higher than about 120 kg/cm$^2$.

In view of the above, the present inventors have studied the foregoing problems and found that the bulging phenomenon of the seat as described above is caused by the following manner.

Specifically, when the valve body 5 is revolved in the direction of an arrow R as shown in FIG. 3(A) and a portion of the seat 4 is begins to separate from the circumferential surface 4c of the seat 4, the corner 4a of the seat is bulged to the outside of the groove since a high pressure, e.g., of greater than 120 kg/cm$^2$ is applied to the inner circumferential surface 4c of the seat 4. Then, accompanying the bulge or the protrusion of the corner 4a, the sealing point S1 is displaced radially inwardly. On the contrary, since the volume of the seat 4 is constant, the corner 4b on the counter top end displaced radially outwardly by the amount corresponding to the bulge of the corner 4a. Then, when the valve body 5 is further opened as shown in FIG. 3B, the above-mentioned phenomenon becomes more conspicuous, until the diameter for the sealing point S2 becomes greater than the diameter for the sealing point S1, whereupon the fluid pressure acts in the direction of enforcing the seat 4 out of the groove 3c. Thus, when the seat 4 completely detaches from the valve body 5 and opposes to the through hole 6, the relevant portion of the seat 4 instantaneously bulges out of the retaining groove 3c.

As described above, the bulging phenomenon of the seat is caused, upon valve opening action taken under the state where a high fluid pressure is being applied to the inner circumferential surface of the seat, by the change that the radial size for the sealing point S1 of the seat 4 relative to the valve body is decreased as compared with the radial size for the sealing point S2 of the seat relative to the side wall on the counter-top end of the inner ring.

SUMMARY OF THE INVENTION

Accordingly, the technical problem to be overcome by the present invention resides in maintaining the radial size of the sealing point S1 constantly greater than the radial size for the sealing point S2 even when a high fluid pressure is applied to the inner circumferential surface of the seat.

In order to attain the above-described technical purpose, according to the present invention such that an inner groove is formed at the counter-top end along the circumferential wall of the inner ring that forms the half-groove and corresponds to the inner circumferential surface of the seat so that the counter-top end along the inner circumferential part of the valve seat bulges out into the inner groove when fluid pressure is exerted in the direction of compressing the valve seat toward the inner ring.

In accordance with the foregoing structure, since the counter-top end of the inner circumferential surface of the valve seat bulges out into the inside of the inner groove of the inner ring when the fluid pressure is exerted in the direction of compressing the valve seat relative to the inner ring, that is, when the valve is operated, the sealing point S2 for the corner on the counter-top end of the inner circumferential surface of the seat is displaced radially inwardly to the corner on the counter-top end of the inner groove. Upon valve opening, if a portion of the seat begins to detach from the valve body, the corner on the top end along the inner circumferential surface of the seat bulges outwardly from the retaining groove in the same manner as in the prior art. However, since there is a radial step between the top end along the inner circumference of the seat and the counter-top end along the inner circumference of the seat bulging into the inner groove, the component of the fluid pressure acting on the inner circumferential surface of the seat in a direction towards the counter-top end becomes greater, so as to force the counter-top end along the inner circumference of the seat into the inner groove and, accordingly, the extent of the protrusion tending to bulge out of the retaining groove is reduced as compared with that in the prior art. Then, even if the amount of the seat bulging out of the retaining groove is increased to displace the sealing point S1 radially inwardly, the radial dimension for the sealing point S1 is not made smaller than the radial dimension for the circumferential wall from the inner groove to the top end in the half-groove of the inner ring. On the other hand, the sealing point S2 is displaced to the corner on the counter-top end of the inner groove as described above. Therefore, the radial dimension for the sealing point S1 is not made smaller than the sealing point S2, whereby an intended technical object can be attained and the bulge of the seat from the retaining groove can effectively be prevented even when the fluid pressure exceeds 120 kg/cm$^2$.

In the present invention, since an inner groove is provided to the circumferential wall formed on the top end of the inner ring and the counter-top end along the inner circumferential surface of the seat is caused to bulge into the inner groove by utilizing the elastic deformation of the elastic seat such as made of rubber, the structure of the seal mechanism is simplified and the manufacturing cost is reduced as compared with that of the prior art, as well as providing for a sufficient sealing performance even under cold conditions.

BRIEF DESCRIPTION OF THE DRAWINGS

These and other objects, as well as the advantageous features of the present invention will be better understood by the following descriptions which are made in conjunction with the appended drawings, wherein FIG. 4A is a cross sectional view of a part of a seal mechanism as a preferred embodiment according to the present invention, FIG. 4B is an enlarged cross sectional view of a part of the inner ring in a state where the seat is urged toward the valve body in FIG. 4A and FIG. 5 is a cross sectional view of the seat shown in FIGS. 4A and B.

DETAILED DESCRIPTION OF THE PREFERRED EMBODIMENTS

Figure 1:
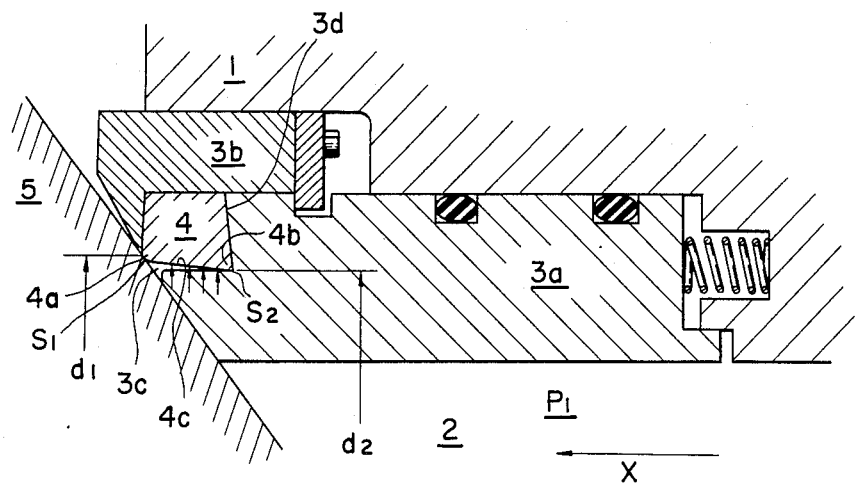
FIG. 1 is a cross sectional view of a part of a ball valve seat mechanism in accordance with the prior art.

A preferred embodiment according to the present invention will now be described with reference to FIGS. 4A and B.

As illustrated in FIG. 4A, a ball valve comprises a valve housing 1 having an annular valve seat retainer 13 which is movably fitted in upstream and downstream directions along the flowing direction of a fluid in a fluid conduit 2. An annular valve seat 14 made of rubber is retained in the valve seat retainer 13 for providing fluid-tight sealing while being in contact with the circumferential surface of the ball-like valve body 5. The valve seat retainer 13 comprises an inner ring 13a and an outer ring 13b which is tightly fitted to the outer circumference thereof and movable in upstream and downstream directions along the fluid passing direction, and the valve seat is fitted within a valve seat retaining groove 13c formed between the outer circumference on the top end of the inner ring 13a and the inner circumference on the top end of the outer ring 13b. More particularly a recessed annular groove 8 is formed at a predetermined position around the outer circumference of the inner ring 13a and an annular flange 7 is secured at the end face on the counter-top end of the outer ring 13b. The inner circumferential part of the flange 7 is loosely fitted within the recessed groove 8 of the inner ring 13a. Accordingly, the outer ring 13b can be displaced upstream and backwardly along the outer circumference of the inner ring 13a in the fluid passing direction X within a range of the difference 11 between the thickness of the flange and the lateral size of the recessed groove in the inner ring 13a. Furthermore, annular recessed grooves 9a, 9b are formed around the outer circumference of the inner ring 13a in which are fitted O-rings 10a, 10b, respectively, that are kept in contact with the inner circumference of the valve housing 1 for providing liquid-tight sealing. Further, a spring 11 is contained in a spring chamber 12 formed at a predetermined portion along the inner circumferential surface of the valve housing 1. One end of the spring 11 abuts against the side wall 12 on the counter-top end of the inner ring 13a to thereby continuously urge the entire inner ring 13a in the fluid passing direction X.

Figure 2:
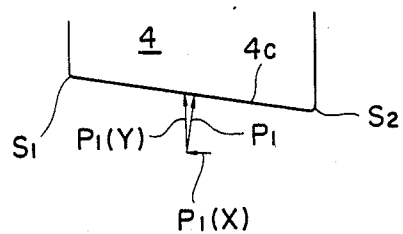
FIG. 2 is an explanatory view showing the state where fluid pressure is exerted in the inner circumferential surface of the seat in FIG. 1, FIGS. 3A and 3B are explanatory cross sectional views respectively showing the state where the seat bulges out of a retaining groove.

Referring now to the valve seat retaining groove 13c, it is constituted as specified below. A half-groove 22 generally of an L-shaped cross section is provided in the top end around the outer circumference of the inner ring 13a. The half-groove 22 is defined by a radially inner circumferential surface 15 and an axially upstream conical surface 16. The circumferential surface 15 is not cylindrical, as it is in the prior art shown in FIGS. 1-3, but consists of an axially downstream, radially outward first cylindrical portion 15a, an axially upstream, radially inward second cylindrical portion 15b, and a conical surface 15c connecting the first and second portions 15a and 15b. The conical surface 15c is inclined such that its downstream edge is radially outward of its upstream edge. The axially upstream conical surface 16 extends radially outwardly from the upstream edge of the circumferential surface 15. The axially upstream conical surface 16 is inclined in the axially downstream direction from a radially inner, axially upstream edge to a radially outer, axially downstream edge. The conical surface 15c, the radially inward second cylindrical portion 15b of the radially inner circumferential surface 15, and the radially inner portion of the axially upstream conical surface 16 together define an inner groove 15d.

A half-groove 20 which is also of a generally L-shaped cross-section is provided around the inner circumference of the outer ring 13b. The half-groove 20 is defined by a radially outer circumferential surface 18 and an axially downstream annular surface 19 on a protrusion 17 which is a part of the outer ring 13b. The annular surface 19 is perpendicular to the axial direction, and the radially outer circumferential surface 18 is cylindrical.

The half-groove 22 in the inner ring 13a and the half-groove 20 in the outer ring 13b are joined to constitute the valve seat retaining groove 13c, which is also of a generally rectangular cross section. It should, however, be noted that an edge opening 21 is formed between the protrusion 17 from the outer ring 13b and the top end of the radially inner circumferential surface 15 of the inner ring 13a in parallel with the axis.

The annular valve seat 14 made of rubber and has a cross sectional shape which is generally the same as that of the valve seat retaining groove 13c. Specifically, the outer circumferential face 14a and the inner circumferential face 14b are parallel with each other and the downstream end face 14c and the counter-top (or upstream) end face 14d are parallel with each other, respectively, to define a generally rectangular cross section, except that the edge 23 on the top (or downstream) end of the inner circumferential face 14b is rounded. The axial dimension for the thickness l2 of the valve seat 14 is made identical with the longest lateral size L2 for the valve seat retaining groove 13c. Further, the radial dimension for the thickness l3 of the valve seat 14 is made smaller than the radial dimension L3 at the counter-top (upstream) end of the valve seat retaining groove 13c and is made equal to or slightly smaller than the radial dimension L4 at the top end.

The valve seat 14 having the foregoing structure is tightly fitted within the valve seat retaining groove 13c and deformed as shown in FIG. 4A. That is, since the axial dimension for the valve seat retaining groove 13c is narrowed toward the outer circumference, the other outer circumferential face 14a on the counter-top (upstream) end of the valve seat 14 is not compressed uniformly. Namely, since the outer side of the valve seat 14 is compressed more intensely, the edge 24 on the counter-top end of the valve seat or axially upstream 14 is displaced radially more inwardly along the axially upstream conical surface 16 than the edge 23 on the top (downstream) end is displaced radially inwardly along the axially downstream annular surface 19. The edge 23 on the top (downstream) end bulges out of the opening 21 in the valve seat retaining groove 13c to be in contact with the circumferential surface of the ball-like valve body 5. Consequently, the contact point S1 forms a sealing point relative to the circumferential surface of the ball-like valve body 5. A certain clearance is formed between the inner circumferential surface 14b of the valve seat 14 and the radially inner circumferential surface 15 of the valve seat retaining groove 13c.

When a fluid pressure P1 exerted on the inner ring 13a, since the diameter d3 for the sealing point relative to the inner circumferential surface of the valve housing 1 is greater than the diameter d1 for the sealing point relative to the circumferential surface of the ball-like valve body 5, the inner ring 13a is displaced in the fluid passing direction X to produce a so-called self-tightening force. FIG. 4B shows such a state. Then, the counter-top (upstream) end face 14d of the valve seat 14 is further urged toward the axially upstream conical surface 16 of the valve seat retaining groove 13c, and the edge 24 on the counter-top (upstream) end thereof is further inwardly displaced relative to the edge 23 on the top (downstream) end. In this case, the counter-top (upstream) end along the inner circumferential part of the seat 14 bulges into the inner groove 15a to fill the interior thereof. The surface pressure of the side face 14d on the counter-top (upstream) end of the valve seat 14 to the inclined wall 16 is made greater toward the outer side. Then, it becomes difficult for the fluid to intrude between the side face 14d on the counter-top (upstream) end of the valve seat 14 and the axially upstream conical surface 16 of the valve seat retaining groove 13c, whereby the sealing point of the valve seat 14 against the wall surface of the valve seat retaining groove 13c transfers to the point S2 where the corner 24 on the counter-top end of the valve seat 14 is in contact with the inclined wall 16. As the result, since the diameter d1 for one sealing point S1 is further increased relative to the diameter d2 for the other sealing point S2, and since the component of the fluid pressure exerting on the inner circumferential surface 14b of the seat 14 in the direction to the counter-top (upstream) end is greatly increased, the fluid pressure P1 acts to force the valve seat 14 into the valve seat retaining groove 13c.

Then, when the valve body 5 is opened as shown by the dotted chain in FIG. 4(B) and the edge 23 on the top (downstream) end along the inner circumferential surface of the seat 14 detaches from the circumferential surface of the valve body 5, the edge 23 tends to bulge out of the half-groove 22 in the same manner as in the prior art. The degree of the protrusion increases in accordance with the increase in valve opening and the sealing point S1 is gradually displaced radially inwardly, but the sealing point S1 can not be displaced inwardly beyond the first portion 15a along the radially inner circumferential surface 15 of the inner ring 13a, that is, the portion having a greater radial size than that of the second portion 15b in the inner groove 15d. On the other hand, the sealing point S2 is situated at the corner 15c of the inner groove 15d. Therefore, it is assured that the sealing point S1 is always situated at a larger diameter side relative to the sealing point S2, whereby the seat 14 can effectively be prevented from bulging out of the half-groove 22.

Moreover, the degree of protrusion of the seat 14 itself can also be decreased as compared with that in the prior art in accordance with the present invention, because the inner circumference of the inner ring 13a is stepwise determined by the formation of the inner groove 15d so as to increase the component of the fluid pressure P1 exerting on the inner circumferential face 14b of the seat 14 in the direction to the counter-top (upstream) end, thereby causing the counter-top end along the inner circumferential part of the seat 14 to bulge into the inner groove 15d.

In the foregoing embodiment according to the present invention, the seat can be prevented from bulging even when a fluid pressure is as high as 150 kg/cm$^2$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A ball valve assembly comprising:
   (a) a valve housing (1) having a fluid conduit (2) therethrough;
   (b) a ball-like valve body (5) movably mounted in said fluid conduit (2);
   (c) a valve seat retainer (13) mounted in said valve housing (1) adjacent to said ball-like valve body (5), said valve retainer (13) comprising:
      (i) an inner ring (13a) the radially inner surface of which acts as an extension of said fluid conduit (2);
      (ii) means (11) biasing said inner ring (13a) towards said ball-like valve body (5) in the direction of fluid flow;
      (iii) an outer ring (13b) which is tightly fitted to the radially outer circumference of said inner ring (13a) but which is axially movable relative thereto in the direction and counter to the direction of fluid flow (X); and (iv) means (7, 8) limiting the axial movement of said outer ring (13b) relative to said inner ring (13a);

(d) a valve seat retaining groove (13c) being formed between the outer circumference of said inner ring (13a) and the inner circumference of said outer ring (13b), said valve seat retaining grove (13c):

(i) being approximately rectangular in cross-section;

(ii) having a radially inner, axially downstream edge opening which is in fluid communication with the interior of said fluid conduit (2);

(iii) having a radially inner circumferential surface (15) in said inner ring (13a) comprising an axially downstream, radially outward first cylindrical portion (15a); an axially upstream, radially inward second cylindrical portion (15b); and a connecting surface (15c) connecting said axially downstream, radially outward first cylindrical portion (15a) to said axially upstream, radially inward second cylindrical portion (15b);

(iv) having an axially upstream conical surface (16) in said inner ring (13a) which is inclined in the axially downstream direction from a radially inner axially upstream edge to a radially outer, axially downstream edge;

(v) having a radially outer circumferential surface (18) in said outer ring (13b) which is at least approximately concentric to both said radially outward first cylindrical portion (15a) and to said radially inward second cylindrical portion (15b) of said radially inner circumferential surface (15); and (vi) having an axially downstream annular surface (19) in said outer ring (13b) which is at least approximately perpendicular to said radially inner and radially outer circumferential surfaces (15 and 18, respectively); and (e) an annular valve seat (14) made of a resilient material tightly fitted within said valve seat retaining groove (13c), said annular valve seat (14):

(i) being at least approximately rectangular in cross-section;

(ii) having a rounded radially inner, axially downstream edge (23) which projects through said radially inner, axially downstream edge opening of said valve seat retaining groove (13c) to make sealing contact with said ball-like valve body (5);

(iii) having an axial length (12) which is at least approximately equal to the longest axial length (L2) of said valve seat retaining groove (13c); and (iv) having a radial thickness (13) which is equal to or slightly smaller than the radial distance between said axially downstream, radially outward first cylindrical portion (15a) of said radially inner circumferential surface (15) and said radially outer circumferential surface (18).

2. A ball valve assembly as recited in claim 1 wherein said means (7, 8) limiting the axial movement of said outer ring (13b) relative to said inner ring (13a) comprise:

(a) an annular flange (7) secured to one of said inner ring (13a) and said outer ring (13b) and (b) a corresponding annular groove (8) in the other of said inner ring (13a) and said outer ring (13b), said corresponding annular groove (8) being longer in the axial direction than said annular flange (7).

3. A ball valve assembly as recited in claim 2 wherein:

(a) said annular flange (7) is secured to said outer ring (13b) and (b) said corresponding annular groove (8) is formed in said inner ring (13a).

4. A ball valve assembly as recited in claim 1 wherein the resilient material of which said annular valve seat (14) is formed is rubber.

5. A ball valve assembly as recited in claim 1 wherein said connecting surface (15c) comprises a conical surface (15c).

* * * * *